No. 737,313. PATENTED AUG. 25, 1903.
G. A. BADER.
LENS GRINDING MACHINE.
APPLICATION FILED NOV. 2, 1901.
NO MODEL. 4 SHEETS—SHEET 1.
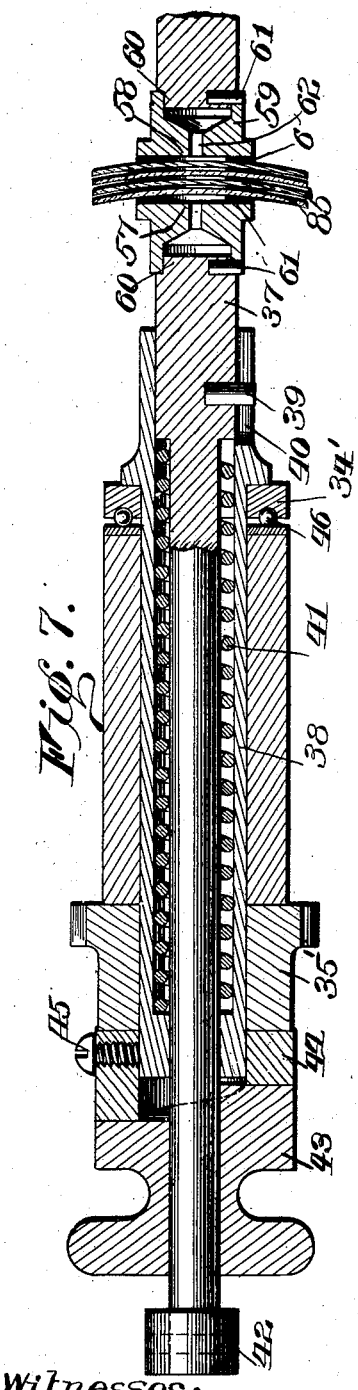
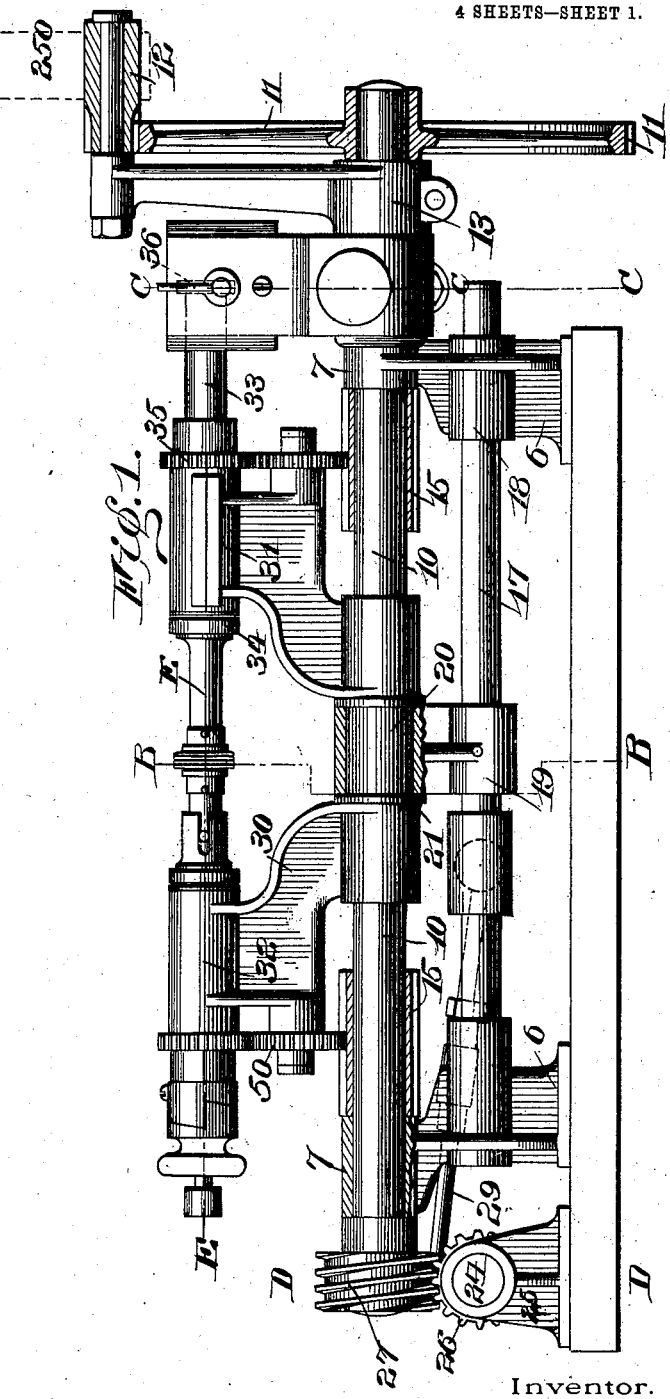
Witnesses:
Inventor.
Attorney No. 737,313. PATENTED AUG. 25, 1903.
G. A. BADER.
LENS GRINDING MACHINE.
APPLICATION FILED NOV. 2, 1901.
NO MODEL. 4 SHEETS—SHEET 2.
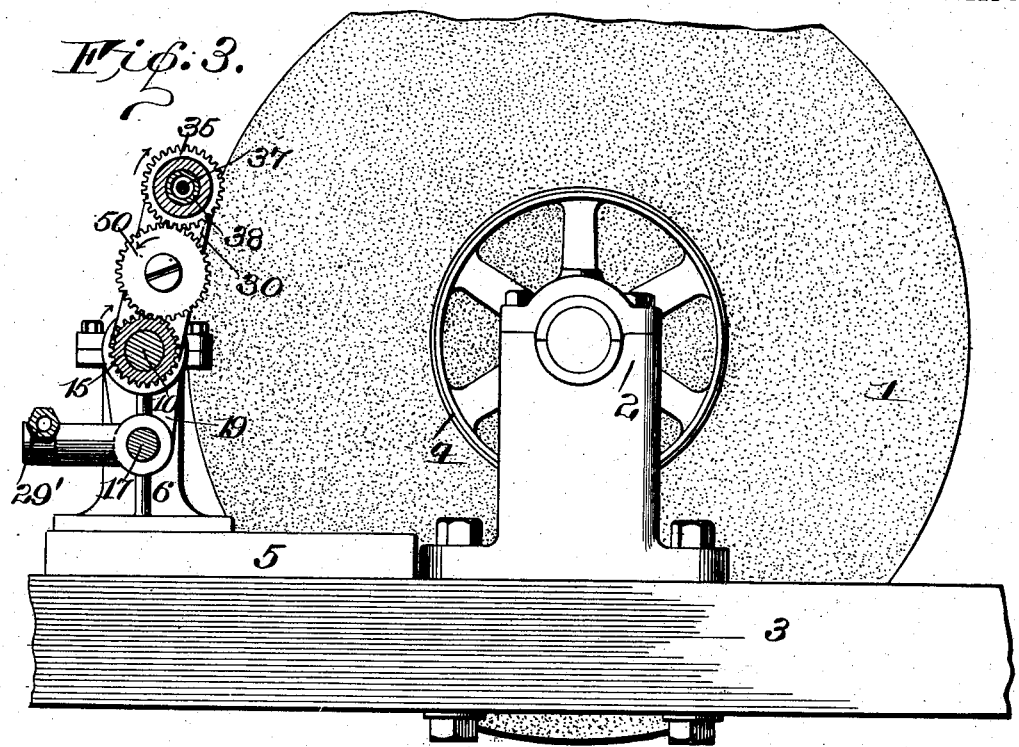
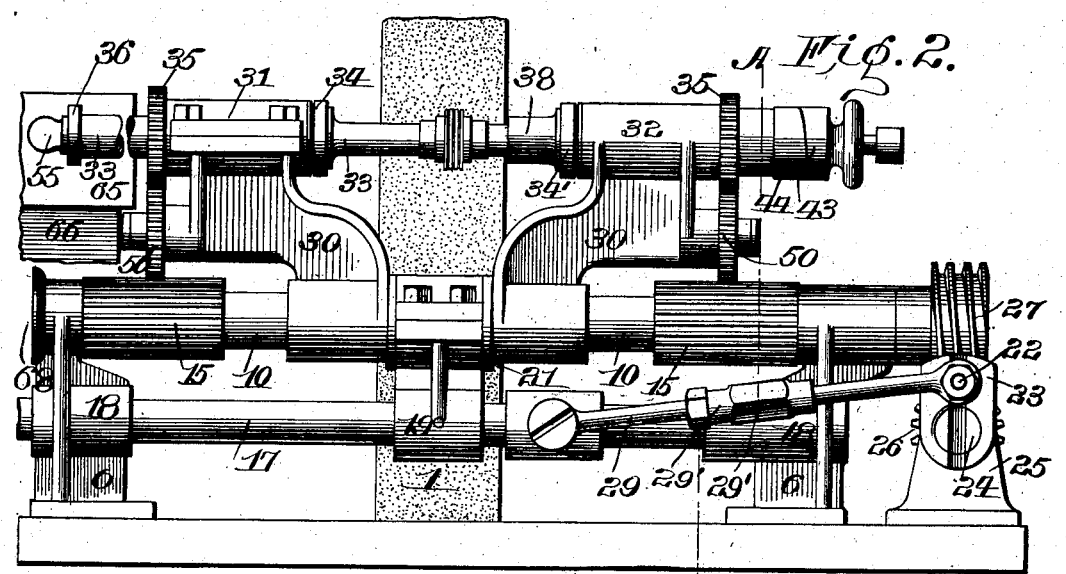
Witnesses. Inventor.
Walter B. Payne. Gustav A. Bader
Elizabeth J. Perry by Frederick F. Church
his Attorney No. 737,313. PATENTED AUG. 25, 1903.
G. A. BADER.
LENS GRINDING MACHINE.
APPLICATION FILED NOV. 2, 1901.
NO MODEL. 4 SHEETS—SHEET 3.
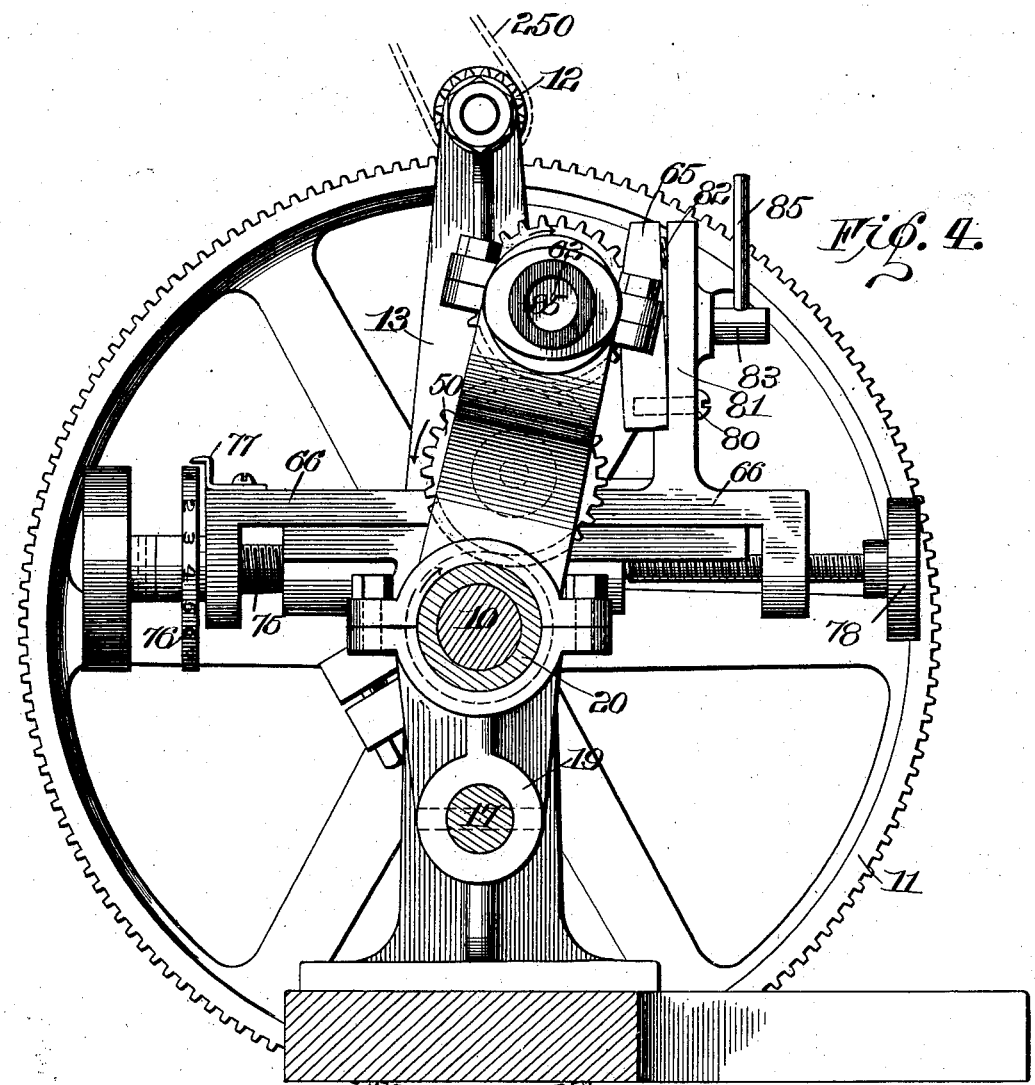
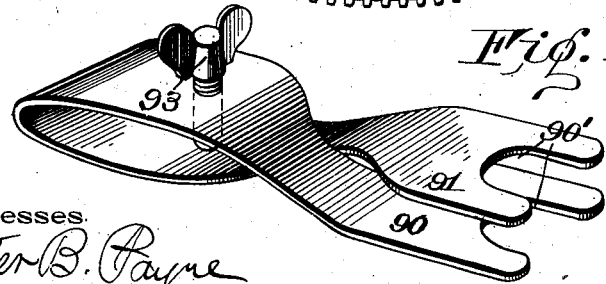
Witnesses. Inventor.

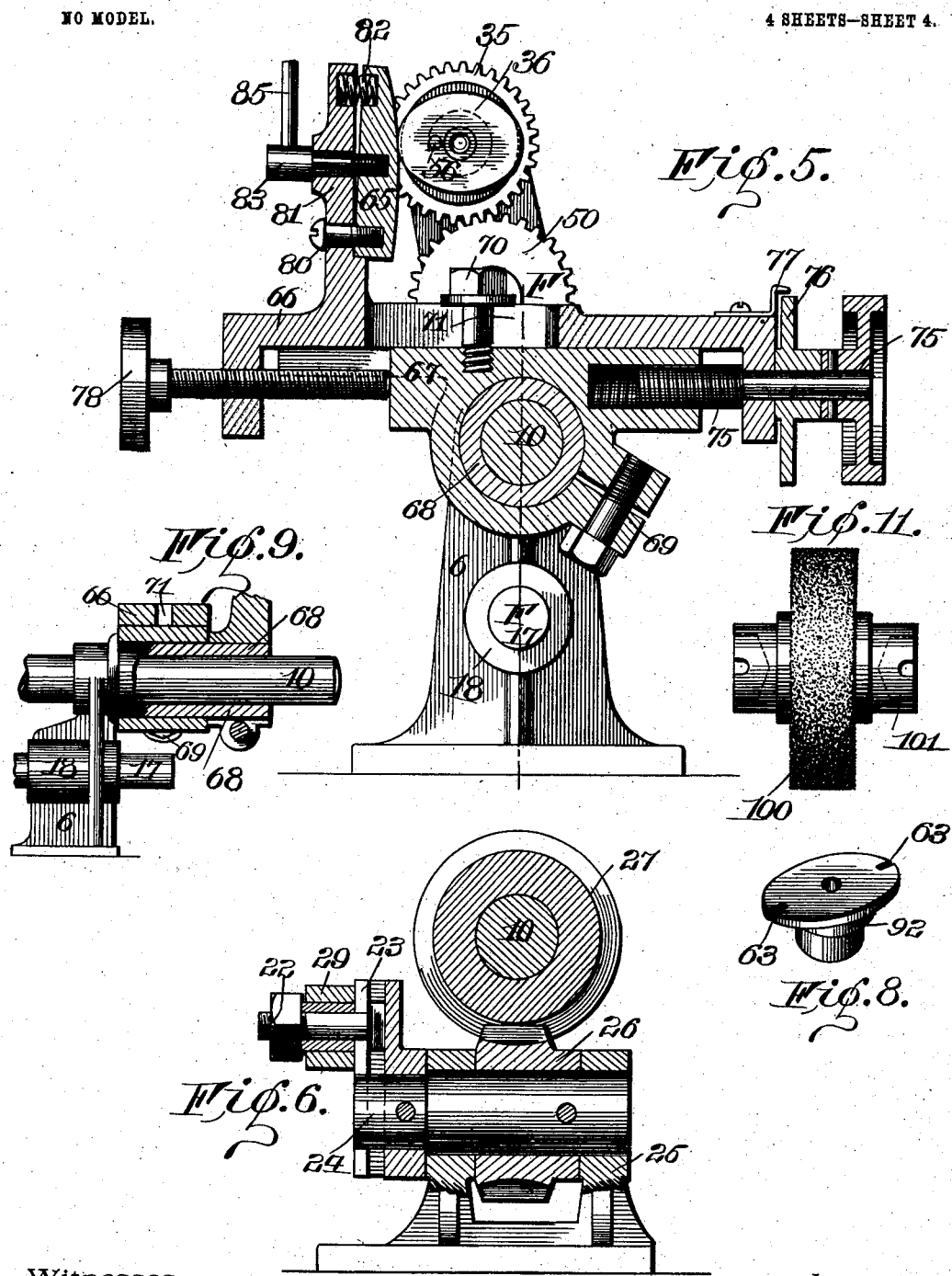

No. 737,313. Patented August 25, 1903.

UNITED STATES PATENT OFFICE.

GUSTAV A. BADER, OF ROCHESTER, NEW YORK, ASSIGNOR TO E. KIRSTEIN SONS COMPANY, OF ROCHESTER, NEW YORK, A CORPORATION OF NEW YORK.

LENS-GRINDING MACHINE.

SPECIFICATION forming part of Letters Patent No. 737,313, dated August 25, 1903.

Application filed November 2, 1901. Serial No. 80,892. (No model.)

*To all whom it may concern:*

Be it known that I, GUSTAV A. BADER, of Rochester, in the county of Monroe and State of New York, have invented certain new and useful Improvements in Lens-Grinding Machines; and I do hereby declare the following to be a full, clear, and exact description of the same, reference being had to the accompanying drawings, forming a part of this specification, and to the reference-numerals marked thereon.

My present invention relates to lens-grinding machines, and particularly to that class for grinding the edges of eyeglass or spectacle lenses; and it has for its object to provide a device in which a quantity of work consisting of several pieces may be accurately mounted and their edges dressed in such a manner that their optical center shall be coincident with the mechanical center in the finished product.

My invention has for its further object to provide a mechanism whereby the lenses may be automatically held in contact with the grinding-stone with an even pressure that is exerted with equal force upon the high as well as the low points of the work.

To these and other ends my invention consists in certain improvements in construction and combination of parts, all as will be hereinafter fully described, the novel features being pointed out in the claims at the end of this specification.

In the drawings, Figure 1 is a rear elevation of a lens-grinding machine constructed in accordance with my invention with the grinding wheel or stone removed. Fig. 2 is a similar front elevation thereof. Fig. 3 is a cross-sectional view thereof on the line A A of Fig. 2, showing the position of the device relative the grindstone. Fig. 4 is a cross-sectional view on the line B B of Fig. 1. Fig. 5 is a similar view on the line C C of Fig. 1. Fig. 6 is a cross-sectional view on the line D D of Fig. 1. Fig. 7 is a longitudinal sectional view of the lens-carrying arbor, taken on the line E E of Fig. 1. Fig. 8 is a detail perspective view of one of the chuck members. Fig. 9 is a sectional view on the line F F of Fig. 5. Fig. 10 is a perspective view of the clamp employed for mounting the lenses and applying them to the machine. Fig. 11 is a side elevation of a truing-wheel employed to finish the face of the grinding-wheel.

Similar reference-numerals in the several figures indicate similar parts.

The grinding-machine forming the subject of my invention embodies a grinding wheel or stone (indicated by 1) of any convenient diameter, mounted in bearings 2 on a frame 3, the forward edge of the latter extending in front of the stone and forming a support for the operating devices carrying the lenses, as will be described.

The grindstone may be operated by any suitable means, such as a driving-belt passing over a pulley 4 on the shaft thereof. Mounted on the frame 3 in front of the grindstone is a base 5, having near its ends brackets or standards 6, provided with bearings 7, in which is journaled a shaft 10, carrying at one end a large gear 11, coöperating with a pinion 12, supported upon an arm 13, adjustably mounted upon a sleeve extension 68, projecting outwardly from the adjacent bearing 7. The pinion is provided at one side with a smooth surface forming a pulley adapted to receive a driving-belt 250, (indicated in dotted lines, Figs. 1 and 4,) by means of which the operation of the several parts is effected.

15 indicates driving-pinions attached to the shaft 10, adjacent the inner ends of the bearings 7, and upon the shaft and between the pinions is sleeved a carriage or support 16, capable of a sliding movement.

Located beneath the shaft 10 is a slide-rod 17, mounted in guides 18 in the bracket 6 and attached to the carriage by means of a coupling 19, the upper end of which surrounds a central sleeve 20 and lies between the flanges 21 of the carriage-frame. A reciprocatory motion is imparted to the rod by a pitman 29, attached thereto and connected at its outer end to a wrist-pin 22, carried on a crank 23, attached to an arbor 24, mounted in a bracket 25 and provided with a worm-pinion 26, operated by a worm 27 on the shaft 10. The crank-arm 23 is slotted to permit an adjustment of the wrist-pin to vary the travel of the carriage as desired, and in order to cause the same to be equal upon either side of the center of the face of the grinding-stone 1 I provide a turnbuckle 29', whereby the pitman-rod may be lengthened or shortened to compensate for the variance in the throw of the crank under different adjustments.

The carriage 16 embodies the diverging arms 30, having at their upper ends the elongated bearings 31 and 32, in which are supported the coöperating sections of the lens-carrying shaft or arbor. The latter is composed of two portions or sections, one of which (indicated by 33) is mounted in the bearing 31 and prevented from longitudinal movement therein by a collar 34 and a gear 35, arranged at the inner and outer edges of the bearing, respectively, and at the outer end of this portion of the arbor is mounted the templet or pattern 36, which is to be further described. The opposite section 37 of the lens-arbor is adapted to be held pressed toward the end of the portion or section 33 and movable axially thereof, and for this reason it is mounted in a sleeve 38, journaled in the bearing 32 and prevented from lateral movement therein by the collar 34' and the gear 35', corresponding to the collar 34 and gear 35 and arranged at the inner and outer ends of the bearing, respectively. The shaft is revolved with the sleeve through a pin 39, operating in a slot 40, and it is forced toward the other section by a spring 41, inclosed within the sleeve, its movement being limited by engagement with the end of the section 33 or by a head 42, adapted to engage a revoluble handpiece 43, having upon its inner end a cam-surface coöperating with a similar surface on a collar or ring 44, secured rigidly to the end of the sleeve 38, as by a screw 45. By this arrangement the shaft 37 may be retracted against the tension of the spring when desired by simply turning the handpiece 43, as will be understood. To reduce the friction between the collars 34 34' and the ends of the bearings, due to the outward thrust upon the shaft 33 and the sleeve 38, occasioned by the spring 41, I provide bearing-balls 46, arranged between said surfaces, as shown.

The separate shafts or sections 33 and 37, forming the lens-arbor, are only united by the compressional force of the spring 41, holding one in contact with the other or in contact with work-pieces located between them, and as it is desirable to cause their positive synchronous rotation I provide intermediate pinions 50, mounted upon the arms 30 of the carriage and intermeshing with the driving-pinions 15 and the gears 35 and 35', the pinions 15 being formed of such a length that the carriage may be freely reciprocated with the pinions 50 always in mesh therewith.

To give the desired size and outline to the lenses, the templet or pattern 36 is mounted on the end of the shaft 33 and removably secured thereto by means of a thumb-nut 55, as shown in Fig. 2. A pin 56 on the templet (shown in Fig. 4) entering a recess in the end of the shaft causes the pattern to be securely positioned, although capable of ready removal when it is desired to apply a pattern differing in shape or size.

At the proximate ends of the shafts 33 and 37 are arranged face-plates 57 and 58, having on their rear sides collars 59, centered upon annular shoulders 60, formed on the ends of the shafts. The face-plates are secured to their respective shafts and revolved therewith by means of pins 61, forming projections engaging slots or recesses in the collars 59. One of the face-plates, and preferably the one indicated by 58 on the shaft 33, is provided with a cover of rubber, leather, or similar yielding material corresponding approximately to the pattern 36 and having upon its face an index mark or marks, in the present instance narrow slits or apertures 63, arranged on the line of the longest diameter, which corresponds to the center line of the lens and which for convenience will hereinafter be called the "horizontal axis of the lens and pattern;" but this expression, it will be understood, refers only to the major axis of the elliptical outline, and not necessarily to the optical axis of the lens. The face-plate 58 is so secured to the shaft 33 that the horizontal axis indicated by the slits 63 lies in the same plane with the axis of the pattern 36, and the face-plates are further provided with central apertures 62 as a guide in positioning the lenses. The latter previous to the grinding operation have their optical centers marked and also have their horizontal axes indicated by a line, by means of which predetermined points they may be arranged with their centers coincident with that of the aperture 62 and their horizontal axial lines registering with the index-marks 63, and in this position a lens on the arbor is revolved about its true optical center, irrespective of the irregular outline of its edges, at the commencement of the grinding operation, so that when the lens is completed its mechanical center, as determined from its edge, and its optical center are coincident.

The templet or pattern as it is revolved upon the lens-arbor bears against the curved surface of a guide or stop-plate 65, corresponding to the face of the grindstone or wheel 1 and carried upon a bracket 81 on a slide 66, whereby it may be adjusted to bring into alinement with the face of the stone. The slide is carried upon a head 67, rotarily adjustable upon the sleeve 68, extending outwardly from the bearing 7 on the frame (also supporting the arm 13 before mentioned) and having the split bearing, which may be adjusted by a bolt 69 to secure the head at a desired point of adjustment, whereby the guide or stop-plate 65 may be tilted to bring its curved face in parallel alinement with the face of the stone 1. This adjustment permits the stop-plate to be moved so that the center upon which its face is curved may be arranged in line with the center of the grindstone, which is advantageous, in that it allows me to employ the lens-arbor and parts in connection with any grindstone without particular reference to the horizontal alinement of the axes of said parts. The guide 65 should be in line with the face of the stone to cause a lens to be ground accurately to the size of the pattern, and when once adjusted it requires no further manipulation for various-sized patterns that may be employed, and to lock the guide I provide a bolt 70, extending through an elongated slot 71 and entering the head 67; but if it is desired to change the size of a lens it will be readily seen that it may be effected by shifting the guide or stop-plate forward of the plane of the face of the grindstone if larger, and in rear thereof if it is desired to decrease the size of the lens. In order to accomplish this, I provide an adjusting-screw 75, passing through the slide and engaging the head 67, whereby the former may be adjusted on the head, a disk 76 on the screw, having a graduated edge coöperating with an index-finger 77, serving to indicate the extent of movement of the stop-plate. At the opposite side of the slide is a locking-screw 78, adapted to engage the rear side of the head. The stop-plate 65 is further adjustable on the slide, whereby the latter may be adjusted and secured in the proper position to form a lens of the desired size when completed, while the stop is moved forward of the plane of the face of the stone or wheel at the commencement of the grinding operation to remove the high points or projections on the lens gradually. Such an arrangement prevents the lens from injury by being raised and suddenly dropped back against the stone after said projections are passed, as would be the case if the stop were adjusted in the first place to the position it occupies when the lens is completed. This is accomplished by hinging or loosely connecting the plate 65 at one end by a screw 80, passing loosely through an aperture in the bracket 81, permitting the plate to be moved outwardly by a spring 82, said movement being limited by a screw 83, having an arm or handle 84, whereby it may be adjusted as the grinding operation approaches completion until the edge of the lens has become perfectly smooth, when the plate may be secured rigidly to the bracket and the grinding operation completed. In practice the slide is usually adjusted so that the stop when its limit of adjustment is reached lies in rear of the face of the grindstone, so that during its last revolution or more the lens moves in constant contact with the stone independently of the stop. By this arrangement the edge of the lens may be ground perfectly smooth without the chatter-marks which occur from irregularities in the stone occasioned by unequal wearing of the surface.

Several lenses may be conveniently operated upon at the same time, and in the illustrations I have shown four; but this number may be increased, if desired. The lenses are mounted on the face-plate 58 with their axial lines and centers properly arranged, as before described, for a single lens, and between them are placed rubber washers 85, permitting them to be compressed without injury. To facilitate mounting the lenses in this manner, I employ a hand-clamp (illustrated in Fig. 9) constructed of a piece of spring metal and having the arms 90 and 91 crossing each other at their sides, at which points portions are cut away, allowing their outer ends to overlap and to be freely movable toward and from each other. The forward ends of the arms are provided with semicircular notches 90', adapted to receive the collars 59 on the face-plates in rear of the flanges 92 and 92' thereon. The normal tendency of the spring-arms is exerted to hold them in the closed position, and this may be overcome by compressing the rear of the arms in the hand, when the face-plate 58 may be placed in the notch 90' in the lower arm 90 and the lenses positioned thereon alternately with the washers 85. The opposite face-plate 57 is then applied and the grasp upon the spring-arms released, allowing the arm 91 to engage the flange 92'. Further compressional force may be applied by means of a thumb-screw 93, threaded into the rear end of the arm 90 and engaging the arm 91, and as the arms cross each other it will be seen that by adjusting the screw to force their rear ends apart their forward ends will be moved toward each other to compress the face-plates and lenses. By the use of the hand-clamp the operator is assisted in accurately mounting either one or more lenses, and the apertures or perforations 62 in the face-plates permit him to accurately position each lens with its optical center over the aperture in the first plate and also to arrange the second plate centrally with the first. The parts thus secured may be applied between the ends of the shafts 33 and 37, where they will be securely held under pressure of the spring 41 when the hand-clamp is to be removed. The feature of clamping the lens-blanks on face-plates which are capable of application to the arbor in a certain relation, and which plates have definite indicating-marks thereon, enables me to readily and accurately position the blanks for cylindrical lenses, for instance, while out of contact with the machine, and then to apply them at once without the necessity of special adjustment after being placed between the arbors.

The lenses being mounted as described and the grindstone operating toward the work, the pinion 12 is operated to revolve the gear 11 and the shaft 10 toward the stone, as indicated by arrows in Figs. 3 and 4. This motion is imparted to the driving-pinions 15 and through the intermediate pinions 50 to the gears 35 35' on the lens-arbor, causing the latter to also revolve, turning the work continuously toward the stone. The pressure of the work against the face of the grinding-wheel is occasioned by the friction of the lens-arbor in the bearings 31 and 32, said retarding movement forming, in effect, a brake acting upon the pinions 15, and the carriage being free to revolve about the shaft 10 will be impelled toward the grindstone. The lenses are elliptical or otherwise irregularly shaped, and as they are revolved the lens-arbor is constantly moving toward or from the grindstone, so it will be seen that the means employed for holding the carriage in operative position is automatic in its operation, thereby holding the lenses with equal tension or pressure against the stone as the sides and ends of the lenses are alternately revolving into contact with the stone, causing a swinging movement of the carriage on the shaft 10. The pressure of the collars 34 34' against the end of the bearings creates sufficient friction to cause the movement of the carriage toward the face of the grindstone, as described; but as it is impracticable to employ light bearings in a machine of this description I place the bearing-balls, as shown, between the adjacent ends of the bearings and the collars, so that the friction between the parts is not excessive over that required to produce the desired tension or movement of the carriage toward the grindstone when a single lens is being operated upon. When a series of lenses are mounted between the sections of the arbor, the spring 41 is under greater compression, thereby causing additional friction between the bearings and collars, causing the carriage to be impelled toward the stone with a corresponding force proportional to the number of lenses being ground at a single operation. It will be understood that other frictional devices might be employed to accomplish this same result, whereby the movement of the carriage toward the stone may be adjusted relative to the thickness of a lens to produce a light contact for a thin lens and a heavier contact for a thick one. The carriage is reciprocated to carry the lenses across the face of the stone by the pitman and the worm gear and wheel 26 and 27, respectively. The construction of the lens-arbor also permits the application of a truing-wheel, such as shown in Fig. 11 and operated in connection with a circular pattern, as will be understood, the wheel 100 having the sockets 101, corresponding to the collars 59 on the face-plates, whereby it may be applied to the lens-arbor in the exact position assumed by the lenses and operated to finish the face of the stone in perfect parallelism with the plane in which the lens-arbor moves, and by its use I am enabled to apply my lathe to any grinding-wheel and true the face thereof to produce the most satisfactory work.

The base 5, the swinging carriage thereon, the stop limiting the movement of the latter, and the lens-arbor and driving mechanism therefor, all of which are arranged in front of the grindstone, constitute a lathe in which a lens or any other article may be mounted and revolved for any purpose irrespective of the grindstone, and the latter in this instance, broadly considered, performs the function of an operating-tool.

The grinding-machine I have described is adapted to finish lenses of any thickness, and it is adapted to grind those having very irregular outlines, as well as circular lenses. The stop-plate as I have arranged it permits a thin or delicate lens to be prepared without requiring especial attention upon the part of the operator. The various novel features shown combine to furnish a grinding-machine that is simple in its construction, and the arrangement of the parts whereby the carriage is moved toward the grindstone automatically enables me to provide a machine capable of producing very accurate work.

I claim as my invention—

1. In a lens-grinding machine, the combination with a grinding-wheel, a movable support, and a rotary lens-holder thereon, of a driving-shaft connected to the holder to rotate it toward the grinding-wheel and operating to exert friction tending to move the support toward the grinding-wheel.

2. In a lens-grinding machine, the combination with a frame, a grinding-wheel, a stop on the frame, a movable support, and a rotary pattern thereon, of a rotary driver, and driving connections between it and the pattern revolving the latter toward the stop, and exerting friction tending to move said support toward said stop.

3. In a lens-grinding machine, the combination with a frame, a grinding-wheel, a movable support, and a pattern thereon, of a driving-shaft revolving toward the grinding-wheel, connections between the shaft and pattern revolving the latter toward the grinding-wheel whereby the friction produced on the driving-shaft tends to move the support toward the grinding-wheel.

4. In a lens-grinding machine, the combination with a frame, a grinding-wheel, a driving-shaft on the frame, a pivoted and longitudinally-movable support, and an arbor on the support provided with a pattern and adapted to carry a lens, of a stop-plate, means for revolving the arbor toward the grinding-wheel and operating to exert friction tending to move the support and to hold the pattern in engagement with the stop, and devices for reciprocating the support.

5. In a lens-grinding machine, the combination with a frame, a grinding-wheel, a driving-shaft on the frame, and a carriage revolubly mounted on the shaft and movable longitudinally thereof, of a lens-holder on the carriage provided with a pattern, a stop on the frame, connections between the shaft and holder operating to revolve the latter toward the stop and to produce friction tending to hold the pattern in contact therewith, and means operated by the driving-shaft for reciprocating the carriage.

6. In a lens-grinding machine, the combination with a frame, a grinding-wheel, a driving-shaft on the frame, and a support revolubly mounted on the shaft and movable longitudinally thereof, of a lens-arbor, connections between the arbor and shaft for revolving the latter toward the grinding-wheel and exerting friction tending to move the support toward the wheel, and devices for reciprocating the carriage operated from the driving-shaft.

7. In a lens-grinding machine, the combination with a frame, a grinding-wheel, a driving-shaft on the frame, and a support movable longitudinally of the shaft, and carrying the lens-holder, of a crank operated from the main shaft and connected to the carriage.

8. In a lens-grinding machine, the combination with a grinding-wheel, an arbor supporting a lens in contact with the wheel, and a movable support carrying the arbor, of an adjustable crank for reciprocating the support, and an adjustable connection between the crank and carriage whereby the latter may be adjusted to move equal distances upon opposite sides of the center of the grinding-wheel when the throw of the crank is altered.

9. In a lens-grinding machine, the combination with a grinding-wheel, a rotary lens-holder, and a movable support carrying the holder, of a driving-shaft, a crank operated thereby, a pitman on the carriage adjustably attached to the crank to vary the movement of the support, and a means for adjusting the length of the pitman whereby the carriage may be moved equally upon opposite sides of a fixed center.

10. In a lens-grinding machine, the combination with a frame, a grinding-wheel, a movable support on the frame, and a lens-holder on the support, of a driving-shaft having a worm-wheel, a worm-gear on the frame operated thereby, and a slotted crank attached to said gear, a pitman connected to the support at one end and at the other to said crank by an adjustable wrist-pin, and an adjusting device in the pitman whereby its length may be varied.

11. In a lens-grinding machine, the combination with a frame, a grinding-wheel, a driving-shaft thereon, and a support revolubly mounted on the shaft and movable longitudinally thereof, and a lens-holder on the support, of a slide-rod connected to the support and movably mounted on the frame, a crank operated by the driving-shaft and connections between it and the rod for reciprocating the support.

12. In a lens-grinding machine, the combination with a frame, a grinding-wheel, a shaft on the frame operating toward the grinding-wheel, and driving-gears thereon, of a support mounted on the shaft between the gears, a lens-arbor thereon embodying two separate sections each provided with a gear, and pinions journaled on the carriage and operating between the driving-gears and the gears on the lens-arbor whereby the separate sections composing the latter may be operated toward the grinding-wheel.

13. In a lens-grinding machine, the combination with a grinding-wheel, a frame, and bearings thereon, of a shaft or arbor journaled in one of the bearings and prevented from longitudinal movement therein, a sleeve revolubly mounted in the other bearing and a shaft or arbor longitudinally movable in the sleeve, devices normally projecting the latter shaft or arbor toward the former, a retracting mechanism, a driving-shaft and connections between it and the two shafts or arbors for causing the positive operation of both.

14. In a lens-grinding machine, the combination with a grinding-wheel, a frame, a driving-shaft thereon having two driving-gears, and a support arranged on the shaft between the gears having bearings thereon, of a shaft or arbor mounted in one of the bearings and prevented from longitudinal movement therein and provided with a gear, a sleeve journaled in the other bearing provided with a gear, and a shaft or arbor movable longitudinally in the sleeve, means for normally projecting said shaft or arbor, retracting devices between the sleeve and shaft, and pinions coöperating with the driving-gears and the gears on the shaft and sleeve respectively.

15. In a lens-grinding machine, the combination with a grinding-wheel, a frame, a driving-shaft thereon having two driving-gears, a support journaled on the shaft between the gears and provided with bearings, a shaft or arbor journaled in one of the bearings and engaging therewith to prevent its outward movement, and a sleeve journaled in the other bearing and engaging therewith to prevent its outward movement, of a shaft or arbor movable longitudinally in the sleeve, means for projecting the said shaft to engage a work-piece between it and the coöperating shaft or arbor, and positive operating connections between the driving gears and shafts operating to revolve the latter and to move the support on the shaft in the direction of rotation of the latter.

16. In a lathe, the combination with a frame having bearings, and a driving-shaft, of an arbor mounted in one of the bearings, a sleeve arranged in the other, and an arbor movable longitudinally in said sleeve, means normally projecting said arbor, a stop limiting its outward movement, and a revoluble handpiece engaging the arbor and provided with a cam-surface engaging the sleeve whereby the arbor may be retracted, and connections between said shaft and the driving-shaft.

17. In a lens-grinding machine, the combination with a grinding-wheel, a frame, a movable support on the latter provided with a pattern-arbor adapted to carry a lens, and means for yieldingly operating the arbor toward the wheel under a uniform pressure during its rotation, of a movable stop coöperating with the pattern to limit the movement of the arbor, and means for adjusting the stop out of contact with the pattern whereby said yielding device may hold the lens in positive contact with the grinding-wheel.

18. The combination with the main frame, a movable support, an arbor thereon adapted to carry a work-piece, and a pattern, of a stop-plate normally engaged by the pattern and movable relative the frame, and a tool arranged stationary relative the pattern and operating on the work-piece, of a driver and connections between it and the arbor operating to revolve the work-piece toward the tool and to move the pattern toward the stop.

19. The combination with the main frame, a relatively movable carriage having a work-arbor, and a pattern thereon, a driver for operating the arbor and a stop-plate on the frame, of friction devices operating upon the driver and normally moving the carriage toward the support, stop-plate, means for moving the plate in contact with the pattern against the carriage-operating devices, and a tool arranged stationary relative to the work.

20. The combination with the main frame, a relatively movable carriage having a work-arbor provided with a pattern, means for revolving the arbor, and friction devices coöperating with said means for moving the carriage yieldingly toward the frame, of a stop-plate on the frame engaged by the pattern, means moving the plate against the action of the friction devices operating on the carriage, adjusting devices limiting the movement of the plate and a tool arranged stationary relative the pattern.

21. In a lens-grinding machine, the combination with a grinding-wheel, a frame, and a movable carriage journaled on the frame having a lens-arbor carrying a pattern and a stop-plate having the curved face coöperating with the pattern to limit the movement of the carriage, of adjustable connections between the frame and stop-plate whereby the latter may be adjusted relative the face of the grinding-wheel, a driver and connections between it and the arbor for revolving the latter toward the grinding-wheel and operating to move the carriage toward the stop.

22. The combination with a stationary tool, a frame, a movable carriage journaled thereon provided with a work-arbor carrying a pattern, and devices normally moving the carriage toward the tool, of a slide on the frame, a stop-plate on the slide coöperating with the pattern to limit the movement of the carriage, and means for adjusting the slide to move the stop-plate relative the tool whereby the size of a work-piece on the arbor may be increased or diminished relative the pattern.

23. In a lens-grinding machine, the combination with a frame, a grinding-wheel, and a carriage having a lens-arbor provided with a pattern, of a stop-plate having the face coöperating with the pattern curved upon a radius approximately equal to that of the stone, a revoluble head carrying said plate and movable transversely on the frame to bring the center upon which the stop-plate is curved into approximate alinement with the center of the grindstone.

24. The combination with a tool, a frame, a carriage pivoted on the frame and movable toward the tool, and an arbor on the carriage carrying a work-piece and provided with a pattern, of a head pivoted on the frame concentric with pivot of the carriage, and a stop-plate on the head engaging the pattern and limiting the movement of the carriage relative to the tool.

25. In a lens-grinding machine, the combination with a grinding-wheel, a frame, a support pivoted thereon and movable toward the stone, and a lens-arbor on the support having a pattern, of a stop-plate having a face coöperating with the pattern curved upon a radius equal to that of the stone, a head pivoted on the frame concentric with the pivot of the carriage, and a slide on the head movable transversely of the frame and supporting the stop-plate.

26. In a lens-grinding machine, the combination with a grinding-wheel, a frame, a support journaled thereon and movable relative the face of the wheel, and a lens-arbor on the support carrying a pattern, of a head pivoted on the frame, a slide adjustably mounted on the head, a stop-plate having a face curved approximately to that of the face of the wheel and coöperating with the pattern to limit the movement of the support, and adjustable connections between the plate and slide, whereby the former may be adjusted relatively to the grinding-wheel independently of the movement of the latter.

27. In a lens-lathe machine, the combination with a lens-arbor embodying two parts or sections, of a face-plate provided with a central aperture said plate being adapted to be removably connected to one of the arbor-sections and to support a lens thereon, and means operating to project the sections relatively to hold them abutting on opposite sides of the face-plate and lens.

28. In a lens-lathe machine, the combination with a lens-arbor, embodying two separate sections and a lens-pattern on one of said sections having an index, of a face-plate adapted to receive a lens having an index and provided with an aperture, means for securing the face-plate to the pattern-shaft with its index corresponding with that of the pattern, and means for projecting said shafts relatively to support the face-plate and lens between them, a movable frame supporting the arbor, driving means for the latter, a stop engaged by the pattern, and a tool engaging the work.

29. An arbor for lens-grinding machines embodying two sections, and a lens-pattern on one of the shafts having an axis, of a face-plate having apertures at opposite sides indicating a corresponding axis on which a lens may be positioned, and means holding said arbor-sections abutting on opposite sides of the face-plate and lens.

30. An arbor for lens-grinding machines embodying two sections, and a lens-pattern on one of the shafts, of a face-plate removably mounted on said sections provided with a cover of elastic material having a central aperture and provided with apertures at opposite sides indicating an axis corresponding to the axis of the pattern, and a second face-plate having an aperture and adapted to be mounted upon the opposite shaft, the two face-plates forming a lens-support.

31. The combination with a lens-grinding machine having an arbor embodying two sections, and means for axially projecting one of the sections relative to the other, of a lens-clamp having the ends adapted to engage on opposite sides of a lens and to coöperate with the lens-arbor to locate the optical center of the lens in line with the center of the arbor.

32. The combination with a lens-grinding machine having a lens-arbor embodying two separable sections, means normally projecting said sections relatively and a lens-pattern on one of the sections having an axis, of a lens-clamp having the ends engaging a lens and adapted to engage the lens-pattern whereby the optical center of the lens may be located in line with the center of the arbor and its axis arranged in line with the axis of the pattern.

33. The combination with a lens-grinding machine, having a lens-arbor embodying two separable sections, means normally projecting said shafts relatively, and a lens-pattern on one of said shafts having an axis, of a face-plate on the latter shaft having a corresponding axis, a lens-clamp and means for centering the lens therein, and the end on the clamp engaging the face-plate to position the lens in axial alinement with the pattern.

34. The combination with a grinding-machine having a lens-arbor embodying two separable sections, means normally projecting said sections toward each other, and a lens-pattern on one of the shafts, of a removable face-plate having an index corresponding to the axis of the pattern and provided with a central aperture, of a clamp having the ends, one of said ends being adapted to receive the face-plate and the other extending over a lens to secure it in engagement with the plate.

35. The combination with a lens-grinding machine embodying a two-part lens-arbor, carrying a pattern, coöperating face-plates removably mounted on the separate parts of the arbor and means for positioning a lens between the face-plates whereby its center and axis is arranged relative the center and axis of the pattern, of a clamp having the ends adapted to engage the face-plates whereby the face-plates and lens may be applied to and removed from the arbor.

36. The combination with a lens-grinding machine having a lens-arbor embodying the separate sections, a pattern on the arbor, and means for projecting said sections toward each other, of face-plates arranged between the shafts and removably attached thereto, and means for positioning a lens between the plates with its optical center coincident with that of the arbor, an index to position the lens axially relative the pattern, and a clamp adapted to engage the face-plates to hold them in position upon the lens during their application to the arbor.

37. The combination with a lens-grinding machine having a lens-arbor embodying separate sections, a pattern on the arbor, and means for projecting said sections relatively toward each other, of face-plates removably supported at the adjacent ends thereof having the collars provided with flanges, and a clamp having the ends recessed to extend over the collars and engaging the flanges to hold the face-plates in compressional engagement upon opposite sides of a lens.

38. In a grinding-machine, the combination with a grinding-wheel, and a rotary arbor consisting of two relatively axially movable sections, said arbor being movable toward the grinding-wheel, of a pattern on one of the arbor-sections, removable face-plates containing position-marks and adapted to fit upon and maintain definite relations to the arbor-sections, whereby blanks may be positioned and clamped between the face-plates and applied to the arbor in definite relations to the pattern.

39. In a grinding-machine, the combination with a grinding-wheel, of a support movable toward and from the surface of the wheel, a rotary arbor thereon, work-clamping devices on the arbor, a rotary pattern controlling the approach of the work and wheel, a rotary member or shaft frictionally engaging the support and operating it toward the wheel, and connections between the member and arbor for revolving the latter toward the grinding-wheel.

40. In a lens-grinding machine, the combination with a frame, a grinding-wheel, a support movable across the face of the wheel, of an arbor thereon, a driver for revolving the latter, and a crank operated by the driver for reciprocating the support across the face of the grinding-wheel.

GUSTAV A. BADER.

Witnesses:
G. WILLARD RICH,
ELIZABETH J. PERRY.